US 9,842,187 B1

United States Patent
Zejda et al.

(10) Patent No.: US 9,842,187 B1
(45) Date of Patent: Dec. 12, 2017

(54) REPRESENTATION OF COMPLEX TIMING CHARACTERISTICS OF STARTPOINT-ENDPOINT PAIRS IN A CIRCUIT DESIGN

(71) Applicant: Xilinx, Inc., San Jose, CA (US)

(72) Inventors: Jindrich Zejda, Saratoga, CA (US); Atul Srinivasan, Woodside, CA (US); Ilya K. Ganusov, San Jose, CA (US); Walter A. Manaker, Jr., Boulder, CO (US); Benjamin S. Devlin, San Francisco, CA (US); Satish B. Sivaswamy, Fremont, CA (US)

(73) Assignee: XILINX, INC., San Jose, CA (US)

( * ) Notice: Subject to any disclaimer, the term of this patent is extended or adjusted under 35 U.S.C. 154(b) by 4 days.

(21) Appl. No.: 15/082,993

(22) Filed: Mar. 28, 2016

(51) Int. Cl.
*G06F 17/50* (2006.01)

(52) U.S. Cl.
CPC ...... *G06F 17/5081* (2013.01); *G06F 17/5054* (2013.01); *G06F 2217/84* (2013.01)

(58) Field of Classification Search
CPC ............. G06F 17/5081; G06F 17/5054; G06F 2217/84
See application file for complete search history.

(56) References Cited

U.S. PATENT DOCUMENTS

| 6,795,951 B2 * | 9/2004 | Hathaway | G06F 17/5031 716/108 |
| 8,347,250 B2 * | 1/2013 | Gonzalez | G06F 17/504 716/113 |
| 8,788,995 B1 * | 7/2014 | Kumar | G06F 17/5031 716/110 |

OTHER PUBLICATIONS

"VLSI Concepts." Clock Reconvergence Pessimism (CRP) Basic l. N.p., n.d. Web. Oct. 22, 2015, 2 pp.
(Continued)

*Primary Examiner* — Naum B Levin
(74) *Attorney, Agent, or Firm* — LeRoy D. Maunu (57) ABSTRACT

Approaches for processing a circuit design include determining pin slack values for pins of the circuit elements in the circuit design. A processor selects a subset of endpoints based on pin slack values of the endpoints being in a critical slack range and determines startpoints of the circuit design that are in respective critical fanin cones. For each endpoint of the subset, the processor determines an arrival time from each startpoint in the respective critical fanin cone and determines for each startpoint-endpoint pair, a respective set of constraint values as a function of the respective arrival time from the startpoint. The processor generates a graph in the memory circuit from the startpoint-endpoint pairs. First nodes in the graph represent the startpoints and second nodes in the graph represent the endpoints, and values in the respective set of constraint values are associated with edges that connect the nodes.

20 Claims, 9 Drawing Sheets

(56) References Cited

OTHER PUBLICATIONS

"VLSI Concepts." Process Variation. N.p., n.d. Web. Oct. 22, 2015, 3 pp.

"VLSI Concepts." "Timing Paths" : Static Timing Analysis (STA) Basic (Part 1) |. N.p., n.d. Web. Oct. 22, 2015, 10 pp.

"Limits of Conventional STA." Wikipedia. Wikimedia Foundation, n.d. Web. Oct. 22, 2015, 2 pp.

Srinivasan, Atul, "A Practical Approach to FPGA Clock Skew Optimization," ACM International Workshop on Timing Issues in the Specification and Synthesis of Digital Systems, Mar. 10, 2016, Xilinx, Inc., San Jose, California, USA.

"ACM International Workshop on Timing Issues in the Specification and Synthesis of Digital Systems," N.p., Mar. 10, 2016, Web. Mar. 28, 2016. <http://www.tauworkshop.com/2016/>.

\* cited by examiner

REPRESENTATION OF COMPLEX TIMING CHARACTERISTICS OF STARTPOINT-ENDPOINT PAIRS IN A CIRCUIT DESIGN

TECHNICAL FIELD

The disclosure generally relates to building a formal graph representation of timing characteristics of startpoint-endpoint pairs in a circuit design.

BACKGROUND

In order to implement a circuit design within an integrated circuit (IC) such as a programmable IC or an application specific integrated circuit (ASIC), the circuit design undergoes processes including synthesis, mapping, placement, and routing. Synthesis refers to the process of converting, or translating, an abstract, programmatic description of a circuit specified in a hardware description language (HDL) into a low-level design implementation. The abstract, programmatic description of the circuit describes the behavior of the circuit and is also referred to as a "behavioral description" or a "register transfer level (RTL) description" of the circuit. The low level design implementation generated through synthesis typically is specified as inter-connected logic gates.

Once synthesized, the resulting low-level circuit implementation is mapped. Mapping is the process of correlating, or matching, the logic gates of the low-level circuit design to the various types of circuit blocks or resources that are actually available in the particular IC in which the circuit design is to be implemented, i.e., the "target IC." For example, since a lookup table (LUT) may implement a complex function, one or more logic gates of the low level design implementation may be mapped to a single LUT, or other programmable tile of the target IC. The mapped circuit design specifies the same functionality as the low level design implementation, albeit in terms of the particular circuit blocks available on the target IC as opposed to low-level logic gates.

Placement is the process of assigning elements of the mapped circuit design to particular instances of circuit blocks and/or resources having specific locations on the target IC. Once placed, an element of the circuit design has a specific location on the target IC as opposed to only being assigned to a particular type of circuit block and/or resource as is the case after mapping and prior to placement. The location of the instance of the circuit block and/or resource on the target IC assigned to an element of the circuit design is the location of that element when placed. Routing is the process of selecting particular routing resources to electrically couple the various circuit blocks of the target IC. In a programmable IC, the routing resources may include wires, programmable interconnection points (PIPs) and/or other interconnect circuitry.

Circuit designs may be evaluated against requirements set forth in a design specification after various stages of the design flow described above. Estimates of circuit design performance relating to timing, power consumption, or the like, may be compared with the requirements of the design specification to determine whether the requirements are met. Aggressive timing requirements pose challenges for implementing circuit designs, whether on programmable ICs or on ASICs. For some circuit designs, tools for implementing the circuit design may require lengthy computation times to determine a feasible placement and satisfy timing requirements, as a programmable IC has a finite number of logic and interconnect resources, and an ASIC has a limited amount of die area on which to implement a circuit design. The computation time increases over time as both design complexity and design reuse increase due to need for higher designer productivity. This results in a need to design both better ICs and design optimization algorithms. Examples of programmable ICs include field programmable gate arrays (FPGAs) and systems on chip (SOCs) having a combination of hardwired processors, programmable logic, and memory.

SUMMARY

According to a disclosed method of processing a circuit design, one or more processors are specifically programmed to determine pin slack values for pins of the circuit elements in the circuit design. The pin slack value of a pin is a least of slack values of all paths that fanin to the pin. The processor(s) selects a subset of endpoints of the circuit design based on pin slack values of the endpoints being in a critical slack range, each endpoint being one of the circuit elements, and determines startpoints of the circuit design that are in a respective critical fanin cone of each endpoint of the subset. All pin slack values in each respective critical fanin cone are in the critical slack range, and each startpoint is one of the circuit elements. The processor(s) determines for each endpoint of the subset, a respective arrival time from each startpoint in the respective critical fanin cone and determines for each pair including an endpoint of the subset and a startpoint in the respective critical fanin cone, a respective set of constraint values as a function of the respective arrival time from the startpoint. The processor(s) then generates a graph in the memory circuit for endpoints of the subset and startpoints that are in the respective critical fanin cones of the endpoints of the subset, wherein first nodes in the graph represent the startpoints and second nodes in the graph represent the endpoints, and values in the respective set of constraint values are associated with edges that connect the first nodes and the second nodes.

A system disclosed herein includes one or more processors and a memory coupled to the one or more processors. The memory is configured with a circuit design and with instructions that when executed by the one or more processors cause the one or more processors to determine pin slack values for pins of the circuit elements in the circuit design. The pin slack value of a pin is a least of slack values of all paths that fanin to the pin. The one or more processors select a subset of endpoints of the circuit design based on pin slack values of the endpoints being in a critical slack range, each endpoint being one of the circuit elements. Startpoints of the circuit design that are in a respective critical fanin cone of each endpoint of the subset are determined by the one or more processors. All pin slack values in each respective critical fanin cone are in the critical slack range, and each startpoint is one of the circuit elements. The one or more processors determine for each endpoint of the subset, a respective arrival time from each startpoint in the respective critical fanin cone, and determine for each pair including an endpoint of the subset and a startpoint in the respective critical fanin cone, a respective set of constraint values as a function of the respective arrival time from the startpoint. The one or more processors generate a graph in the memory circuit for endpoints of the subset and startpoints that are in the respective critical fanin cones of the endpoints of the subset. First nodes in the graph represent the startpoints and second nodes in the graph represent the endpoints, and values in the respective set of constraint values are associated with edges that connect the first nodes and the second nodes.

Other features will be recognized from consideration of the Detailed Description and Claims, which follow.

BRIEF DESCRIPTION OF THE DRAWINGS

Various aspects and features of the method and system will become apparent upon review of the following detailed description and upon reference to the drawings in which.

DETAILED DESCRIPTION

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

Typical optimization tools operate on simplified models of circuit designs in order to make the circuit optimization both algorithmically tractable and runtime efficient. However, a simplified model may lack important circuit details, which may lead to suboptimal final results. As circuits become more complex and silicon manufacturing geometries become smaller, the amount of detail that may aid in optimization is increasing rather than decreasing.

Static timing analysis (STA) of a circuit design generally entails capturing the circuit netlist, cell logic, routing structure, and delay models to compute slack and identify any limiting paths or constraints. As generally understood in the art, a "critical path," generally refers to a signal path that does not meet a timing requirement. The criticality of a path can be measured by the "slack" of the path. Slack refers to the difference between the time a signal is expected to arrive at a particular destination ("pin" or "endpoint") to meet established design constraints and the actual time, or estimated time as determined by the design tool, at which the signal arrives. The more negative the slack, the more critical the path. The path having the most negative slack (least of the slack values) is the most critical path or worst path.

In a simplified model of a circuit design used by an optimization tool, the slack at an endpoint is the worst slack of all paths starting from multiple startpoints (e.g., output pins of registers) and terminating at the endpoint. Aspects of timing paths from startpoints other than the startpoint of the path having the worst slack are generally not reflected in the slack value at the endpoint. Thus, timing information relevant to startpoints other than the startpoint of the path having the worst slack would be unavailable to various optimization algorithms. Therefore such a tool typically approximates timing constraints and slacks due to the other paths by simplified timing using local topological traversals. For example, the worst slack value in a simplified optimization tool timer may not account for startpoints being different circuit elements such as registers, latches, multi-bit register files, or double-edge sensitive registers. Also, the worst slack value may not reflect timing exceptions, edge-specific arcs, asynchronous arcs, multiple clock signals or modes, delay corners, pessimism reductions such as clock reconvergence pessimism reduction (CRPR), on-chip variation, and statistical timing. The worst slack value may not account for technology/vendor specific adjustments (e.g., for memory and IO interfaces), effects of jitter and other noise on path timing, and multi-die delay variation. Furthermore, the single startpoint-based slack value does not contain enough information about all paths leading to the endpoint (circuit data flow state machine behavior) and thus would not indicate how circuit timing may change after a circuit modification. Though this information may be provided by a full STA tool by querying timing information for every register-to-register path, the approach may be impractical due to runtime being exponential relative to the size of the circuit.

The disclosed methods and systems provide approaches for capturing the complex timing characteristics of circuitry that connects an endpoint and selected startpoints in the fanin cone of the endpoint. The disclosed methods and systems generate a simplified graph for each endpoint and the relevant startpoints, such that the graph accounts for the complex timing characteristics of interconnecting circuitry. Rather than just a single slack value associated with an endpoint, the disclosed methods and systems produce multiple startpoint-specific constraint values for each endpoint. The startpoint-specific constraint values may indicate respective setup-like and/or hold-like timing relationships between the startpoints and the endpoint. The set of edges for each startpoint and endpoint pair forms a graph. The sequences and loops of the edges in the graph thereby capture the entire timing-critical dataflow in the circuit's finite state machine behavior.

In one implementation, a processor circuit, such as a computer processor (or "processor" for brevity), executes instructions that cause the processor to input and process a circuit design. The input circuit design may have been previously synthesized, placed, and routed, but not yet optimized to a desired level. The processor determines slack values of pins in the circuit design in order to select a subset of pins ("endpoints") having slack values in a critical slack range. The slack value at an endpoint is the least of the slack values of all paths that fanin to the pin. The critical slack range, which is used to select the subset of endpoints, may be slack values less than 0, for example. The critical slack range may be further restricted in order to reduce the size of the subset of endpoints and save processing time. For each of the endpoints having a slack value in the critical slack range, the processor determines startpoints in a respective critical fanin cone of the endpoint. The critical fanin cone of an endpoint includes only those circuit elements having pin slack values in the critical slack range.

Once the startpoints in the critical fanin cone have been determined, the processor determines for each endpoint having a slack value in the critical slack range, respective arrival times of signals from the startpoints in the critical fanin cone. In determining the arrival times, the attributes of individual circuit elements connecting the startpoint to an endpoint are factored into each arrival time. The arrival times from the same clock but different startpoints are not merged. Instead, the respective arrival times are propagated toward the endpoints. The respective arrival times thereby provide a more detailed assessment of the paths in the critical fanin cone of an endpoint than is presented by the initial slack value of an endpoint.

The respective arrival times may then be used by the processor in determining respective constraint values. That is, for each startpoint in the critical fanin cone of an endpoint, the processor determines a constraint value based on the arrival time at the endpoint of a signal from that startpoint. The constraint values may reflect setup-like and hold-like relationships between the startpoints and endpoint, for example. In a specific implementation, the constraint values include a setup path delay value and a hold path delay value for each startpoint-endpoint pair.

For each endpoint having a slack value in the critical slack range, the processor circuit generates a representation of a graph in a memory. The graph includes nodes that correspond to the startpoints in the critical fanin cone of the endpoint and a node that corresponds to the endpoint. Edges of the graph correspond to the constraint values. For example, one edge of the graph corresponds to the constraint value(s) determined for one of the startpoints and the endpoint. The nodes may be identified by identifiers of the startpoints and endpoints as indicated in the circuit design, and the constraint values may be associated with the edges. As recognized by those skilled in the art, words in a RAM may be configured with data that represent the nodes, other words in the RAM may be configured with data that represent the edges, and still other words may be configured with data that represent the constraint value(s).

The graph of edges for all endpoints and startpoints in the critical fanin cones may then be used by various optimization algorithms for improving aspects of the circuit design such as timing and/or power requirements. The graph provides a global characterization of the timing dataflow behavior for the design rather than worst-case path timing indicated by the initial slack values. The optimization algorithms need not query the timer function of a static timing analysis tool to query register-to-register paths as the relevant information has already been assembled in the graph.

Figure 1:
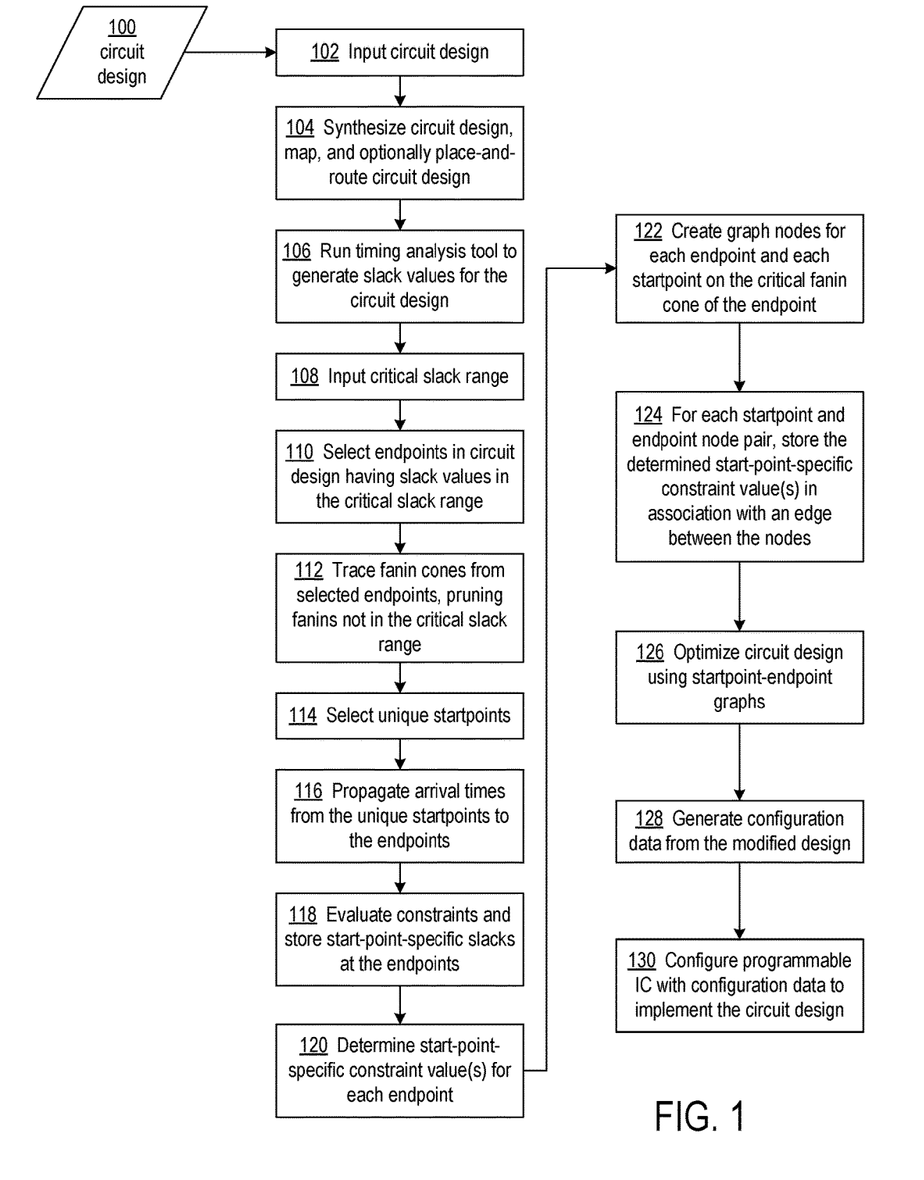
FIG. 1 is a flowchart of a process of representing complex timing characteristics of a circuit design in a simplified manner.

FIG. 1 is a flowchart of a process of representing complex timing characteristics of a circuit design in a simplified manner according to an example implementation. A processor inputs a circuit design 100 at block 102. The circuit design may be specified in a hardware description language (HDL), for example. At block 104, the processor synthesizes, maps, and optionally generates an initial placement and routing of the circuit design. The processor executes a timing analysis tool at block 106 in order to generate slack values for pins in the circuit design.

At block 108, the processor inputs a critical slack range. The critical slack range may be specified by a designer seeking to analyze and improve the circuit design by way of various optimization algorithms. A large critical slack range, for example, slack values less than 0, may be specified to provide a view of all critical paths and timing violations. To reduce the time required for computation and storage requirements, the critical slack range may be reduced.

Figure 2:
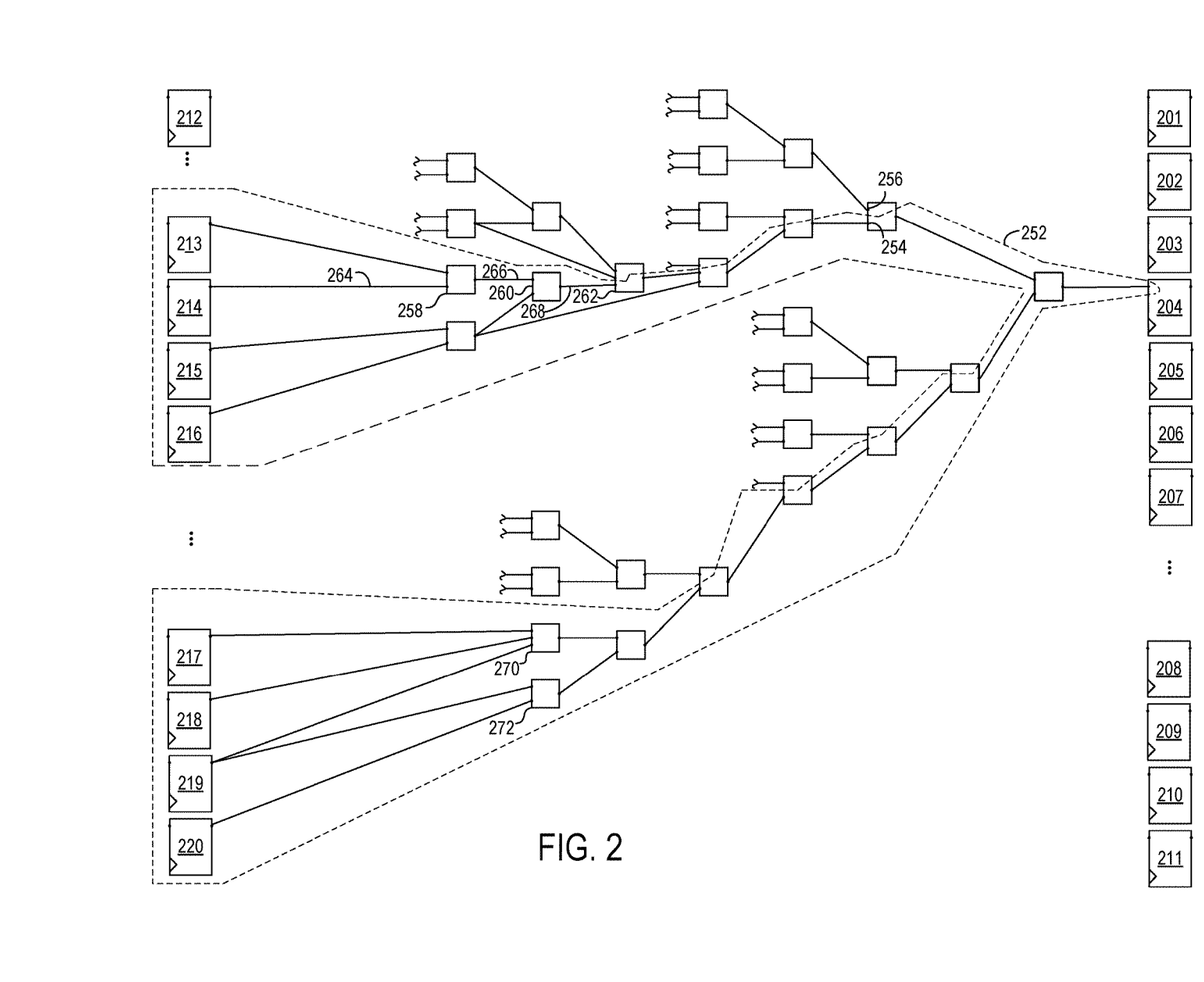
FIG. 2 shows a partial topological view of a circuit design and examples of connections between startpoints in the critical fanin cone of an endpoint.
Figure 3:
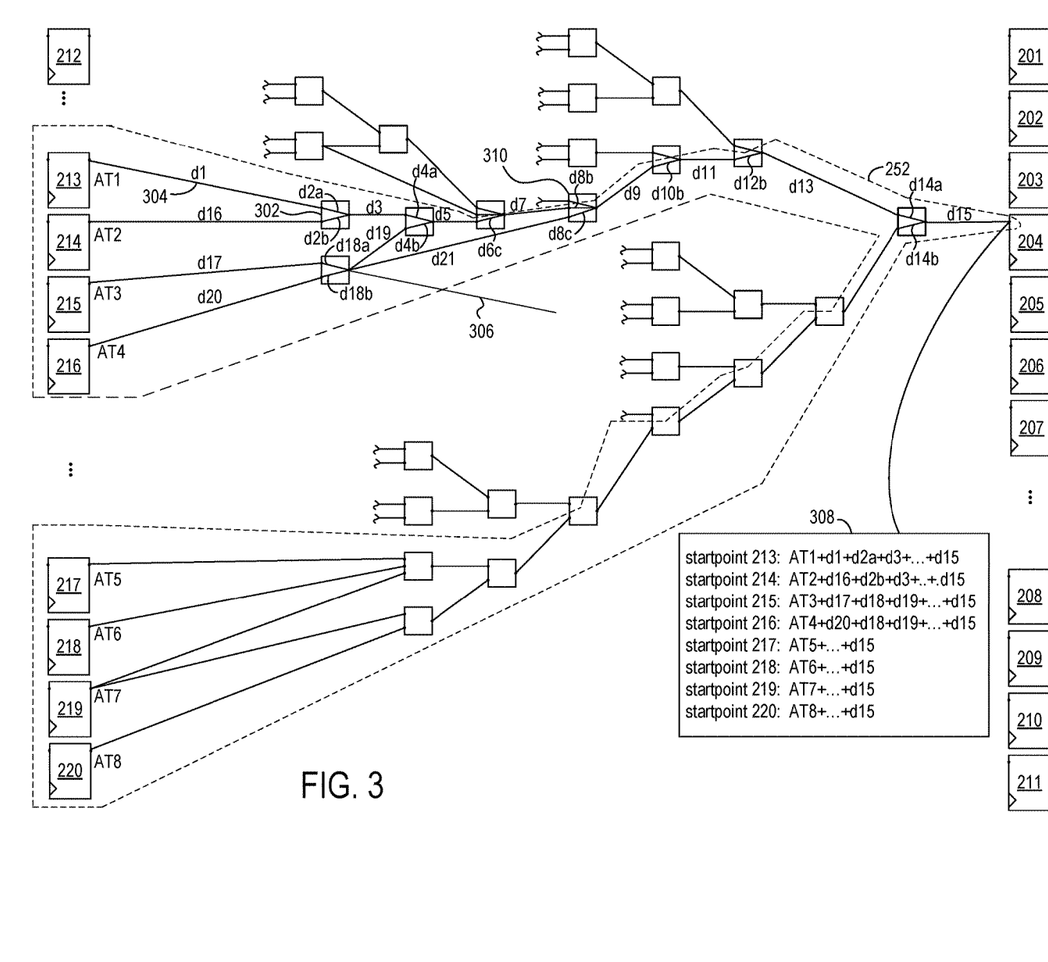
FIG. 3 shows the partial topological view of the circuit design of FIG. 2 and shows propagation of arrival times from the startpoints in the critical fanin cone of the endpoint.
Figure 4:
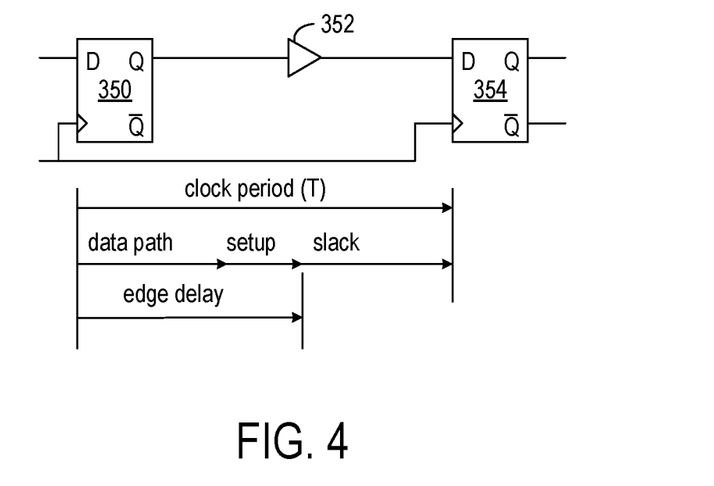
FIG. 4 shows the relationship between the computed setup path delay value and the clock pin of a D flip-flop as the start point, a buffer that generically represents a datapath delay, and the data input pin of a D flip-flop as the end point.

The processing of blocks 110-124 may be performed while executing a timer function of a static timing analysis (STA) tool in one implementation, which makes the process amenable to any circuit the STA timer supports. The processor selects endpoints of the circuit design having slack values within the critical slack range at block 110. As not all endpoints in the circuit design will have slack values in the critical slack range, the selected endpoints are a subset of the endpoints of the circuit design. FIGS. 2, 3, and 4 present examples that are described in conjunction with the process of FIG. 1 in order to illustrate application of the process to a circuit design.

Turning briefly to FIG. 2, a partial view of an example of a circuit design is shown. FIG. 2 shows a topological view of some of the connections between startpoints in the critical fanin cone of an endpoint, which represent the netlist of a placed and routed circuit design. The partial view shows an endpoint 204 in the critical slack range. Endpoints 201, 202, 203, 205, 206, 207, . . . , 208, 209, 210, and 211 are other endpoints of the circuit design. Only endpoint 204 is illustrated as having a slack value in the critical range in order to simplify the diagram and avoid obscuring relevant features.

Returning now to FIG. 1, at block 112 the processor traces the fanin cones from the endpoints having slack values in the critical range and prunes fanins having slack values not in the critical range, resulting in a critical fanin cone for each of the endpoints. Tracing of each fanin path terminates at a startpoint, which is a storage element such a register. In FIG. 2, the critical fanin cone 252 is determined for endpoint 204. In the example, pin 254 is included in the critical fanin cone as the processor determines the slack value to be in the critical slack range. Pin 256 is pruned from the critical fanin cone as the processor determines the slack value to be outside the critical slack range. The processor terminates tracing from pin 256 because the slack value is outside the critical slack range. The example of FIG. 2 includes startpoints 212, . . . 213, 214, 215, 216, . . . , 217, 218, 219, and 220, of which startpoints 213, 214, 215, 216, 217, 218, 219, and 220 are determined to be in the critical fanin cone 252. Logic elements and signal lines connect the startpoints to the endpoint 204. Examples of logic elements are blocks 258, 260, and 262, and examples of the signal lines are lines 264, 266, and 268.

Returning now to FIG. 1, at block 114, the process selects unique ones of the startpoints in the critical fanin cones. For example, startpoint 219 in FIG. 2 fans-out to logic elements 270 and 272, but would be selected as one startpoint in the critical fanin cone.

At block 116, the processor propagates respective arrival times from the set of startpoints in each critical fanin cone to the endpoint. The arrival times that originated at different startpoints are not merged. Therefore, at any pin each arrival time contains full timing information for one of the unique paths through the pin. That is, for each endpoint determined to have a slack value in the critical range, the processor determines a respective arrival time from each startpoint in the respective critical fanin cone. Each respective arrival time is determined based on the specific characteristics of the startpoint and each logic element and signal line between the startpoint and the endpoint.

FIG. 3 continues the example partial circuit design shown in FIG. 2 with an illustration of the propagation of arrival times from the startpoints in the critical fanin cone of endpoint 204. The signal lines and logic elements have associated delay values indicated by labels, dx, where "x" is an integer for a signal line or an integer-letter combination for a logic element. Each of the startpoints has an associated arrival time ("AT"). For example, startpoint 213 has arrival time AT1 and is connected to logic element 302 by signal line 304. Signal line 304 has a delay value d1, and logic element 302 has delay values d2a and d2b. The delay values d2a and d2b indicate the respective delays from the two input pins of the logic element to the output pin of the logic element. The delay values of the signal lines and logic elements may be provided by and obtained from an STA tool or a delay calculator tool. Each delay value accounts for attributes specific to the associated circuit element. For example, each delay value accounts for attributes such as the type of the element (e.g., LUT, buffer, routing, memory, DSP), multiple clock signals or modes, delay corners, pessimism reductions such as clock reconvergence pessimism reduction (CRPR), on-chip variation, statistical timing, technology/vendor specific adjustments (e.g., for memory and IO interfaces), effects of jitter and other noise on path timing, and multi-die delay variation.

In propagating the arrival times, the processor begins with the arrival time at a startpoint, traces connections from the startpoint to the endpoint, and sums the delay values of the connections to determine the respective arrival time for a startpoint-endpoint pair. The propagation is performed for each of the startpoints in the critical fanin cone of each endpoint having a slack value in the critical slack range. The processor does not propagate an arrival time from a pin within the critical fanin cone that is connected to a pin outside the critical fanin cone. For example, signal line 306 connects a pin within the critical fanin cone to a pin outside the critical fanin cone, and the processor does not propagate the arrival time to the outside pin.

The accumulation of the startpoint arrival time and the delays is performed without merging delays within a logic element in the path of another startpoint. The delays between different input pins and an output pin of a logic element are separate values for different startpoints. For example, in accumulating the respective arrival times for startpoints 213 and 214, the accumulated arrival time based on startpoint 213 includes delay value d2a but not delay value d2b, and the accumulated arrival time based on startpoint 214 includes delay value d2b but not delay value d2a.

Block 308 shows the accumulated respective arrival times from startpoints 213, 214, 215, 216, 217, 218, 219, and 220 to the endpoint 204. For the startpoint 213 endpoint 204 pair, the accumulated respective arrival time is:

$$AT1+d1+d2a+d3+d4a+d5+d6c+d7+d8b+d9+d10b+d11+d12b+d13+d14a+d15$$

For the startpoint 214 endpoint 204 pair, the accumulated respective arrival time is:

$$AT2+d16+d2b+d3+d4a+d5+d6c+d7+d8b+d9+d10b+d11+d12b+d13+d14a+d15$$

For the startpoint 215 endpoint 204 pair, the accumulated respective arrival time is:

$$AT3+d17+d18a+\max(d19+d4b+d5+d6c+d7+d8b,d21+d8c)+d9+d10b+d11+d12b+d13+d14a+d15$$

For the startpoint 216 endpoint 204 pair, the accumulated respective arrival time is:

$$AT4+d20+d18b+\max(d19+d4b+d5+d6c+d7+d8b,d21+d8c)++d9+d10b+d11+d12b+d13+d14a+d15$$

In the example, both startpoints 215 and 216 are connected to the logic element having delays d18a and d18b, and the logic element fans out with delays d19 and d21. For startpoints 215 and 216, a "max" function may be used to select the maximum accumulated arrival time at the output pin of logic element 310. The example accumulated arrival times shown in block 308 above assume that for the startpoint 215 endpoint 204 pair and for the startpoint 216 endpoint 204 pair, the d19, d4b, d5, d6c, d7, d8b path has a greater delay than the d21, d8c path. The accumulated respective arrival times for startpoints 217-220 are similarly computed.

Returning now to FIG. 1, at block 118 the processor determines startpoint-specific slack values based on the accumulated respective arrival times. The slack values may be determined by calling a timing function of an STA tool with the accumulated respective arrival times. At block 120, the processor determines startpoint-specific constraint values based on the startpoint-specific slack values. The constraint values may be indicative of setup-like and hold-like relationships relative to each startpoint-endpoint pair. In one implementation, the constraint values indicate a setup path delay value and a hold path delay value. For example, for a simple single-clock circuit the setup path delay value may be determined by:

setup path delay value=$T$-slack where T is the period of the clock signal and slack is the startpoint-specific slack value determined at block 118. The hold path delay value may be determined by:

hold path delay value=Req+slack where Req is the required hold time and slack is the startpoint-specific slack value determined at block 118.

Figure 5:
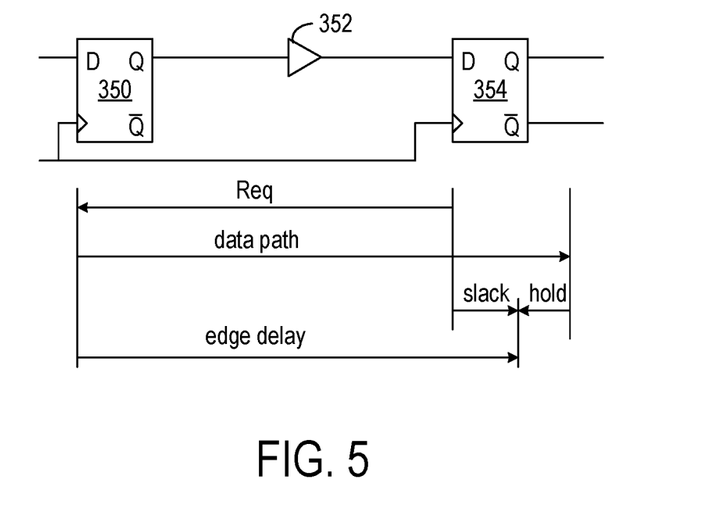
FIG. 5 shows the relationship between the computed hold path delay value and the circuit of FIG. 4.

FIGS. 4 and 5 show circuit-level depictions from which a graph abstraction is generated to include a startpoint, an endpoint, and constraint values that include a setup path delay value and a hold path delay value as described above. FIG. 4 shows the relationship between the computed setup path delay value and the clock pin of D flip-flop 350 as the start point, buffer 352 as generically representing a delay, and the data input pin of D flip-flop 354 as the end point. FIG. 5 shows the relationship between the computed hold path delay value and the clock pin of D flip-flop 350 as the start point, buffer 352 as generically representing a delay, and the data input pin of D flip-flop 354 as the end point.

Other constraint values indicative of setup-like and hold-like relationships may include, but are not limited to a user-specified late-arrival requirement, a multi-clock relationship with clock C1 launching signal at startpoint at time t1 and clock C2 capturing at the endpoint an absolute unrolled time t2 (in such case the above setup-class time requirement called "T" above becomes "t2−t1"), hold at the same edge, multi-cycle hold, and removal timing arcs.

Figure 6:
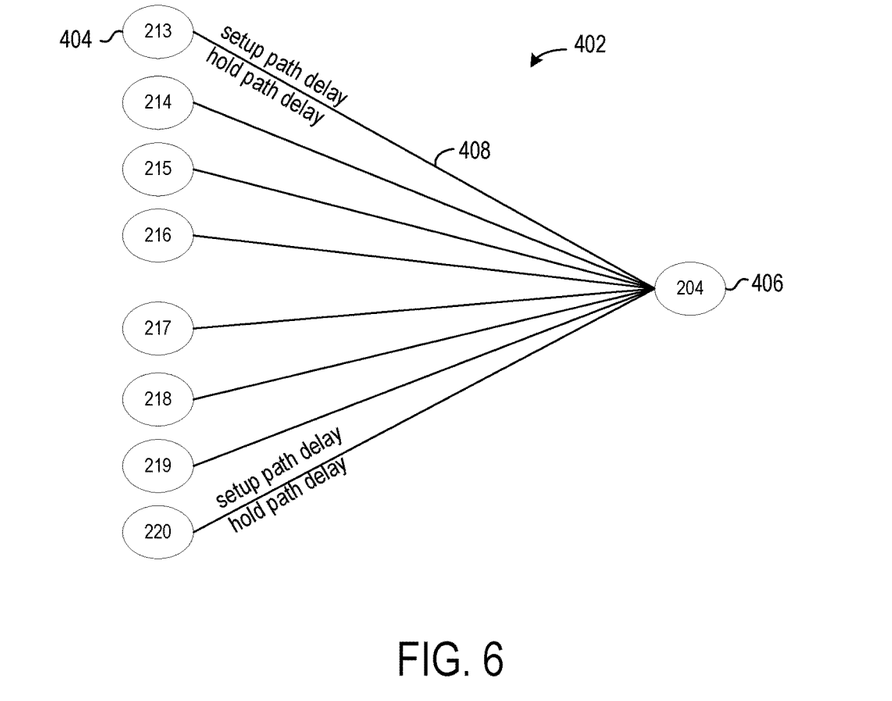
FIG. 6 shows a graph generated for an endpoint and startpoints that are in the critical fanin cone of the endpoint.

At blocks 122 and 124, the processor generates a graph representation for the endpoints determined to have slack values in the critical slack range. At block 122, the processor looks up or adds in the design graph a node that represents the endpoint and nodes that represent the startpoints in the critical fanin cone of the endpoint. At block 124, the processor creates edges that connect the startpoint nodes and endpoint node and stores the constraint value(s) in association with the edges. For example, FIG. 6 shows a graph 402 generated for the endpoint 204 and startpoints 213, 214, 215, 216, 217, 218, 219, and 220, which are in the critical fanin cone of endpoint 204. Node 404 represents startpoint 213, and node 406 represents endpoint 204. Edge 408 represents a connection between startpoint 213 and endpoint 204, and a setup path delay value and a hold path delay value and their respective requirements are the constraint values stored in association with the edge. Each of the other startpoints 214, 215, 216, 217, 218, 219, and 220 is similarly represented by a node in the graph 402 and connected to the node 406. Respective edges connect the nodes of the other startpoints to the node 406 and have respective constraint values stored in association therewith.

In one implementation, one graph is generated for each circuit design or a partition of interest of the circuit design. Most registers will typically be both startpoints and endpoints (D pin is an endpoint and CLK pin is the startpoint). Thus, graph 402 of FIG. 6 can be viewed as a part of the overall graph for a circuit design. Startpoints 213, 214, 215, 216, 217, 218, 219, and 220 may be the endpoints of other startpoints (shown or not shown), and endpoint 204 may be the startpoint for one or more of endpoints 201, 202, 203, 205, 206, 207, . . . , 208, 209, 210, and 211 or startpoints 213, 214, 215, 216, 217, 218, 219, and 220 or other startpoints not shown. Also, the resulting graph may have loops (not shown), such as if node 214 was an endpoint of node 204.

Once the simplified graph has been generated for the endpoints having slack values in the critical slack range, the circuit design may be optimized at block 126 using the generated graph. As the graph has context-specific constraint values associated with startpoint-endpoint pairs, the optimization algorithms can determine if a given netlist change is timing-safe and sufficient (to fix violation), or it may prioritize processing of the startpoint-endpoint paths according to the constraint values, which may enable the optimization algorithms to converge to a desired result faster than if an endpoint had only a single, worst-case slack value, such as by avoiding unsafe netlist/design changes. Examples of optimization algorithms that may make use of the simplified graphs include: useful clock skew, conversion from flip-flops to pulsed latches, common P&R optimizations (rerouting, replication, buffer insertion, bubble pushing, which become globally timing driven with the benefit of the reduced graph), retiming, sequential data flow optimization, and general data flow optimizations such as in software driven programmable logic accelerators.

At block 128, configuration data is generated from the placed-and-routed circuit design. For example, bitstream generation tools may be executed on a processor circuit to generate configuration data for an FPGA. At block 130, a programmable IC may be configured with the configuration data, thereby creating a circuit that operates according to the circuit design.

Figure 7:
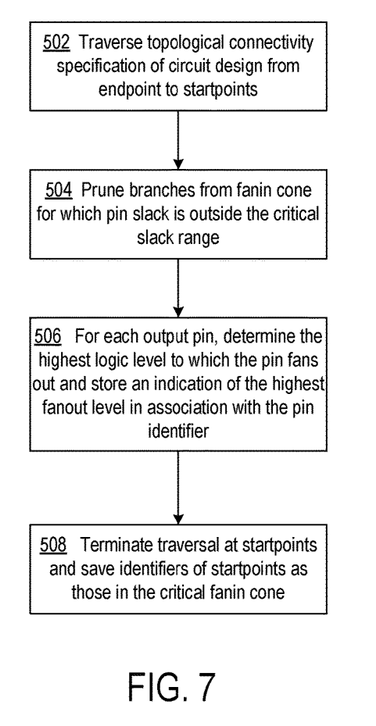
FIG. 7 shows a process of determining the critical fanin cone of an endpoint.
Figure 8:
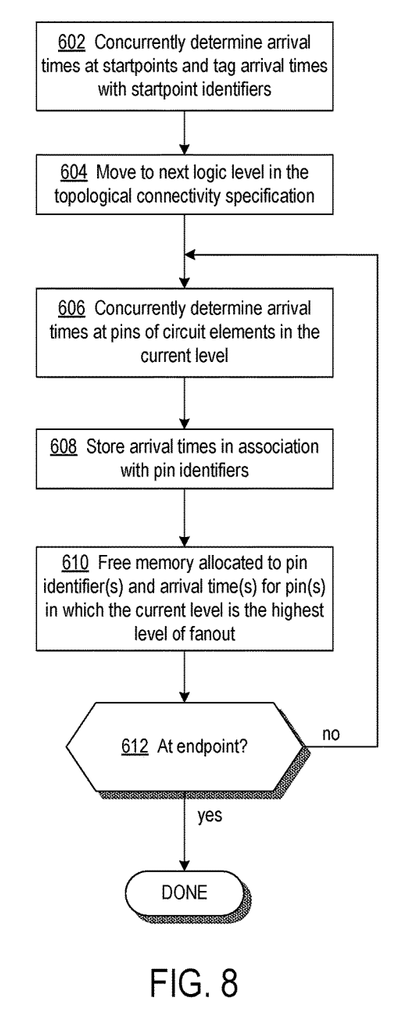
FIG. 8 shows a process of propagating arrival times from the startpoints in a critical fanin cone to the endpoint.
Figure 9:
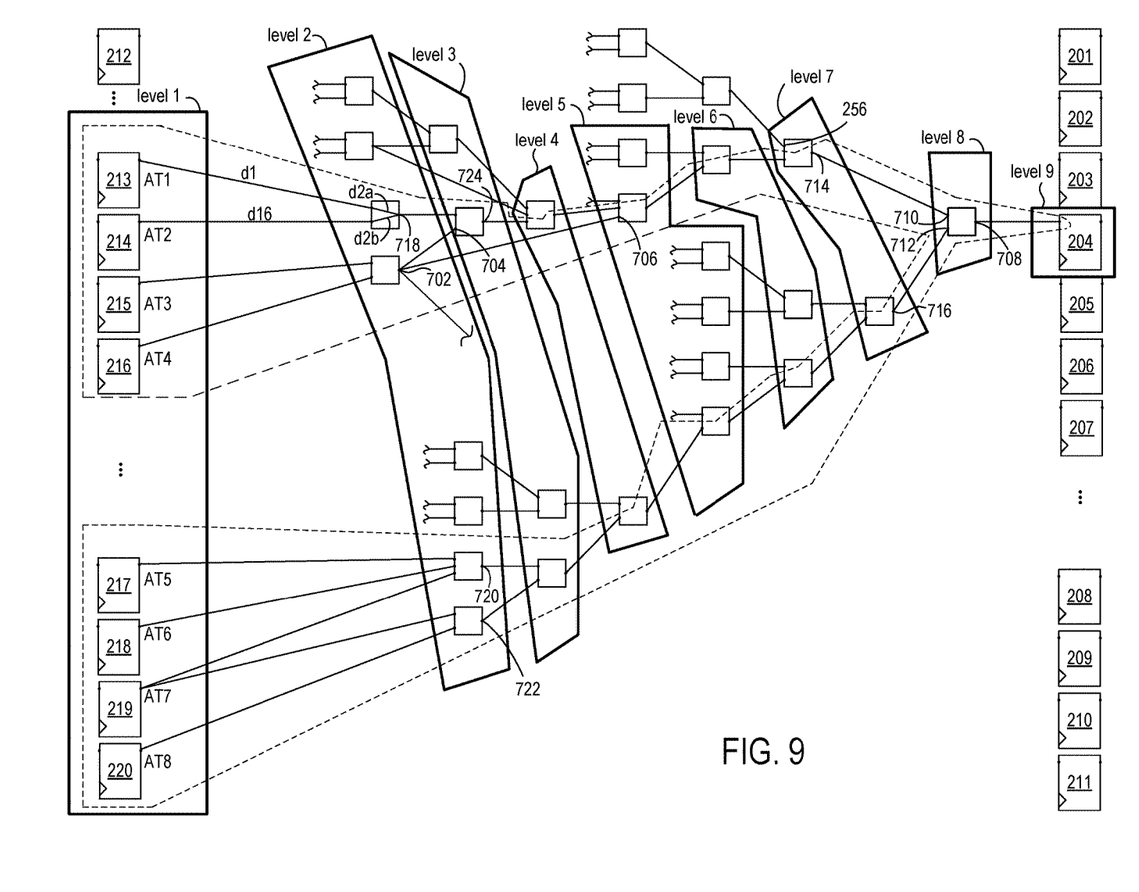
FIG. 9 shows the partial topological view of the circuit design of FIG. 2 and illustrates logic levels and application of concurrent processing discussed.

FIG. 7 shows a process of determining the critical fanin cone of an endpoint, and FIG. 8 shows a process of propagating arrival times from the startpoints in a critical fanin cone to the endpoint. FIG. 9 continues the example partial circuit design shown in FIGS. 2 and 3 with an illustration of logic levels and application of the concurrent processing discussed in FIGS. 7 and 8. The process of FIG. 7 may be performed for each endpoint determined to have a slack value in the critical slack range.

At block 502 in FIG. 7, the processor traverses a topological connectivity specification of the circuit design, which is generated by place-and-route tools, beginning at an endpoint having a slack value in the critical slack range. The connectivity specification describes pin-to-pin connections, which are traversed/traced by the processor. At block 504, upon encountering a pin having a slack value that is outside the critical slack range, the processor terminates following further connections from that pin, effectively pruning a branch from the critical fanin cone. For example, pin 256 in FIG. 9 and the connection thereto may be pruned from the critical fanin cone when the processor determines the slack value to be outside the critical slack range.

At block 506, the processor stores information to be used in propagating arrival times from the startpoints. When an output pin of a logic element is encountered, the processor determines the highest level of the logic hierarchy to which the pin fans out and stores an identifier of the output pin and an associated value indicating the highest fanout level. For example, in FIG. 9, examples of the levels of logic include levels 1-9, with level 1 being the lowest level at the startpoints, and level 9 being the highest level at the endpoint 204. Output pin 702 in FIG. 9 connects to input pin 704 in level 3 and input pin 706 in level 5. Thus, the highest level to which output pin 702 fans out is logic level 5, and the processor stores a value indicating logic level 5 in association with an identifier of output pin 702. The processor counts and assigns the logic levels during the initial timing of the circuit as it traverses from startpoints to endpoints. The levels are updated during this step to only include the critical cone as the processor traverses from the endpoint to the connected output pin 708 and input pins 710 and 712, from input pins 710 and 712 to output pins 714 and 716, etc.

At block 508, upon encountering an output pin of a storage element, such as a register, a startpoint has been found, and the processor terminates tracing further connections from that startpoint and stores an identifier of the startpoint for subsequent reference.

FIG. 8 shows a process of propagating arrival times from the startpoints in a critical fanin cone to the endpoint. The process uses concurrent processing to reduce the time required to determine the respective arrival times of startpoint-endpoint pairs. At block 602, multiple processors or processor cores are activated to concurrently determine arrival times at the startpoints and tag the respective arrival times with unique identifiers of the startpoints. In tagging the arrival times with startpoint identifiers, the processors allocate memory space for respective data structures that store the arrival times in association with the startpoint identifiers. The processors may invoke a timer function of an STA tool to obtain the arrival times. The timer function determines the delay of each connection and delays of other circuit elements. The processors then proceed to concurrently propagate the arrival times to the next level in the connection specification.

At block 604, the processors move to the next logic level in the connectivity specification, and at block 606, the processors concurrently determine arrival times at pins of circuit elements in the current level. For example, in FIG. 9, multiple processors concurrently determine the arrival time at output pins 702, 718, 720, and 722, respectively. At block 608, the processors store in the respective data structures the arrival times accumulated thus far in association with the pin identifiers and unique startpoint identifiers. For example, the arrival time determined for startpoint 213 at output pin 718 is $AT1+d1+d2a$, and the arrival time determined for startpoint 214 at output pin 718 is $AT2+d16+d2b$. Both arrival times are stored in association with pin 718: one relative to startpoint 213 and the other relative to startpoint 214.

At block 610, a processor (of the concurrently operating processors) frees/releases the memory allocated to the data structure that stores a pin identifier and associated arrival times for pins in which the current level is the highest level of fanout. For example, in accumulating the arrival time at output pin 724 in FIG. 9, a processor frees the memory allocated to storage of the pin identifier and arrival times for output pin 718 as level 3 is the highest level of fanout of output pin 718. However, output pin 702 fans out to levels 3 and 5, and the memory allocated to storage of the pin identifier and arrival times for output pin 702 would not be freed until the arrival times are accumulated in level 5. Freeing the memory allocated to storage of a pin identifier and associated arrival times for pins in which the current level of processing is the highest level of fanout improves processor performance and memory usage by keeping only a minimal set of arrival times in memory, leaving memory space for concurrent processing of other arrival times.

At block 612, the processor determines whether an endpoint has been reached in propagating arrival times. If not, the process continues at block 606 as described above. Otherwise, the process is complete.

Figure 10:
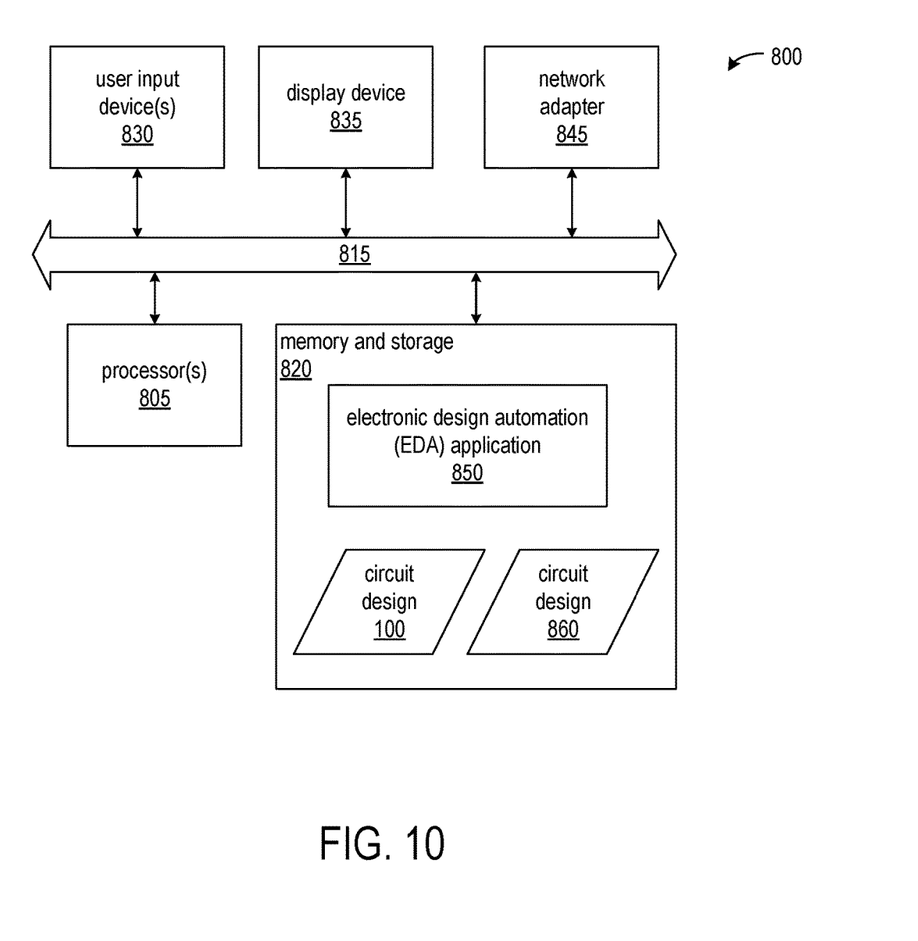
FIG. 10 is a block diagram illustrating an exemplary data processing system.

FIG. 10 is a block diagram illustrating an exemplary data processing system (system) 800. System 800 is an example of an EDA system. As pictured, system 800 includes at least one processor circuit (or "processor"), e.g., a central processing unit (CPU), 805 coupled to memory and storage arrangement 820 through a system bus 815 or other suitable circuitry. System 800 stores program code, such as electronic design automation (EDA) application 850, and circuit design 100 within memory and storage arrangement 820. Processor 805 executes the program code accessed from the memory and storage arrangement 820 via system bus 815. In one aspect, system 800 is implemented as a computer or other data processing system that is suitable for storing and/or executing program code. It should be appreciated, however, that system 800 can be implemented in the form of any system including a processor and memory that is capable of performing the functions described within this disclosure. The program code, which implements the disclosed processes, is encoded in a processor executable format and may be stored and distributed via a variety of computer-readable storage media or delivery channels such as magnetic or optical disks or tapes, electronic storage devices, or over a network. The disclosed processes may also be performed as application services over a network.

Memory and storage arrangement 820 includes one or more physical memory devices such as, for example, a local memory (not shown) and a persistent storage device (not shown). Local memory refers to random access memory or other non-persistent memory device(s) generally used during actual execution of the program code. Persistent storage can be implemented as a hard disk drive (HDD), a solid state drive (SSD), or other persistent data storage device. System 800 may also include one or more cache memories (not shown) that provide temporary storage of at least some program code and data in order to reduce the number of times program code and data must be retrieved from local memory and persistent storage during execution.

Input/output (I/O) devices such as user input device(s) 830 and a display device 835 may be optionally coupled to system bus 815. The system may further include intervening I/O controllers (not shown). A network adapter 845 also can be coupled to system bus 815 in order to couple system 800 to other systems, computer systems, remote printers, and/or remote storage devices through intervening private or public networks. Modems, cable modems, Ethernet cards, and wireless transceivers are examples of different types of network adapter 845 that can be used with system 800.

Memory and storage arrangement 820 may store an EDA application 850. EDA application 850, being implemented in the form of executable program code, is executed by processor(s) 805. As such, EDA application 850 is considered part of system 800. System 800, while executing EDA application 850, receives and operates on circuit design 100. In one aspect, system 800 performs a design flow on circuit design 100, and the design flow may include synthesis, mapping, placement, routing, and the application of one or more physical optimization techniques as described herein. System 800 generates an optimized, or modified, version of circuit design 100 as circuit design 860.

EDA application 850, circuit design 100, circuit design 860, and any data items used, generated, and/or operated upon by EDA application 850 are functional data structures that impart functionality when employed as part of system 800 or when such elements, including derivations and/or modifications thereof, are loaded into an IC such as a programmable IC causing implementation and/or configuration of a circuit design within the programmable IC.

Figure 11:
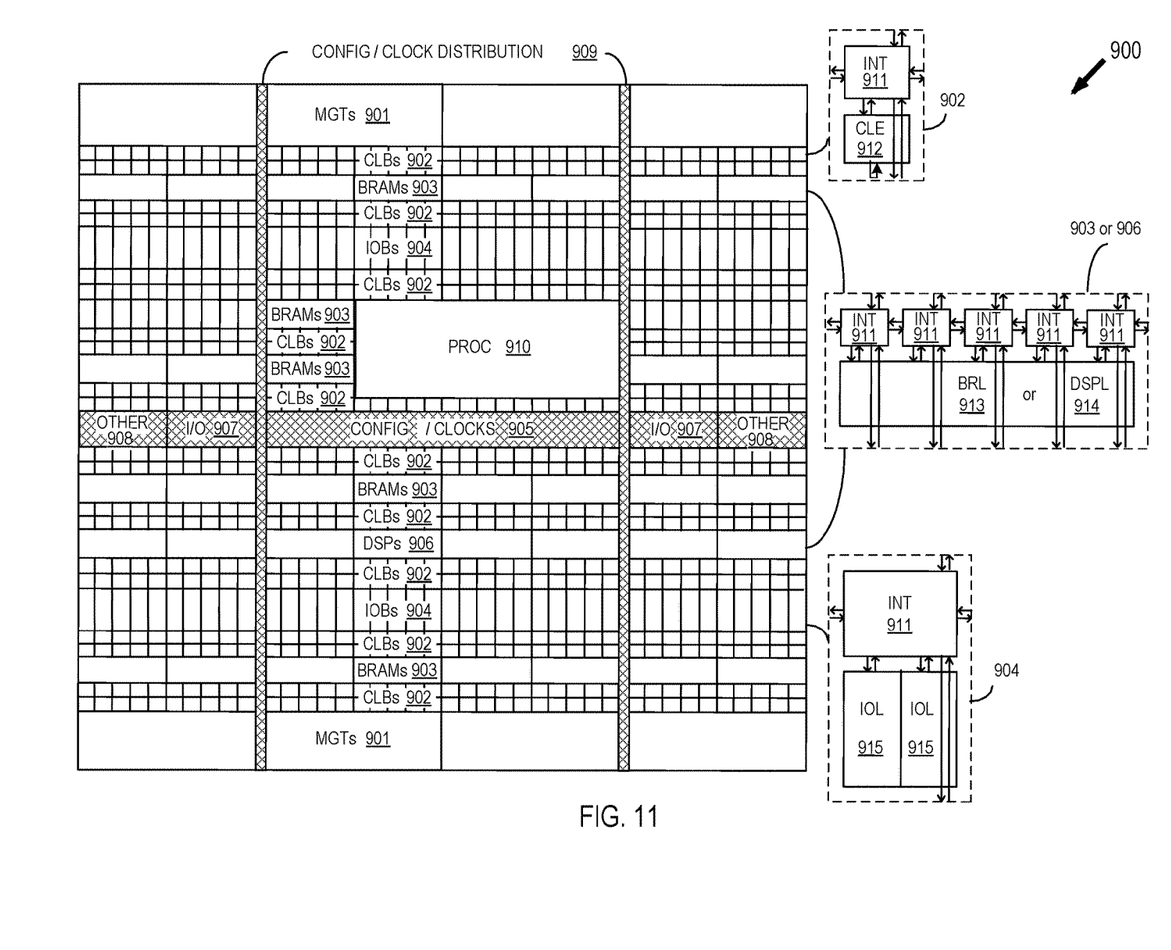
FIG. 11 shows a programmable integrated circuit (IC) 600 on which a circuit design optimized according to the disclosed techniques may be implemented.

FIG. 11 shows a programmable integrated circuit (IC) 900 on which a circuit design optimized according to the disclosed techniques may be implemented. The programmable IC may also be referred to as a System On Chip (SOC) that includes field programmable gate array logic (FPGA) along with other programmable resources. FPGA logic may include several different types of programmable logic blocks in the array. For example, FIG. 11 illustrates programmable IC 900 that includes a large number of different programmable tiles including multi-gigabit transceivers (MGTs) 901, configurable logic blocks (CLBs) 902, random access memory blocks (BRAMs) 903, input/output blocks (IOBs) 904, configuration and clocking logic (CONFIG/CLOCKS) 905, digital signal processing blocks (DSPs) 906, specialized input/output blocks (I/O) 907, for example, clock ports, and other programmable logic 908 such as digital clock managers, analog-to-digital converters, system monitoring logic, and so forth. Some programmable IC having FPGA logic also include dedicated processor blocks (PROC) 910 and internal and external reconfiguration ports (not shown).

In some FPGA logic, each programmable tile includes a programmable interconnect element (INT) 911 having standardized connections to and from a corresponding interconnect element in each adjacent tile. Therefore, the programmable interconnect elements taken together implement the programmable interconnect structure for the illustrated FPGA logic. The programmable interconnect element INT 911 also includes the connections to and from the programmable logic element within the same tile, as shown by the examples included at the top of FIG. 11.

For example, a CLB 902 can include a configurable logic element CLE 912 that can be programmed to implement user logic, plus a single programmable interconnect element INT 911. A BRAM 903 can include a BRAM logic element (BRL) 913 in addition to one or more programmable interconnect elements. Typically, the number of interconnect elements included in a tile depends on the height of the tile. In the pictured programmable IC, a BRAM tile has the same height as five CLBs, but other numbers (e.g., four) can also be used. A DSP tile 906 can include a DSP logic element (DSPL) 914 in addition to an appropriate number of programmable interconnect elements. An IOB 904 can include, for example, two instances of an input/output logic element (IOL) 915 in addition to one instance of the programmable interconnect element INT 911. As will be clear to those of skill in the art, the actual I/O bond pads connected, for example, to the I/O logic element 915, are manufactured using metal layered above the various illustrated logic blocks, and typically are not confined to the area of the input/output logic element 915.

In the pictured programmable IC, a columnar area near the center of the die (shown shaded in FIG. 11) is used for configuration, clock, and other control logic. Horizontal areas 909 extending from this column are used to distribute the clocks and configuration signals across the breadth of the programmable IC. Note that the references to "columnar" and "horizontal" areas are relative to viewing the drawing in a portrait orientation.

Some programmable ICs utilizing the architecture illustrated in FIG. 11 include additional logic blocks that disrupt the regular columnar structure making up a large part of the programmable IC. The additional logic blocks can be programmable blocks and/or dedicated logic. For example, the processor block PROC 910 shown in FIG. 11 spans several columns of CLBs and BRAMs.

Note that FIG. 11 is intended to illustrate only an exemplary programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 11 are purely exemplary. For example, in an actual programmable IC, more than one adjacent column of CLBs is typically included wherever the CLBs appear, to facilitate the efficient implementation of user logic.

Though aspects and features may in some cases be described in individual figures, it will be appreciated that features from one figure can be combined with features of another figure even though the combination is not explicitly shown or explicitly described as a combination.

The disclosed methods and system are thought to be applicable to a variety of systems for optimizing circuit designs. Other aspects and features will be apparent to those skilled in the art from consideration of the specification. It is intended that the specification and drawings be considered as examples only, with a true scope of the invention being indicated by the following claims.

What is claimed is:

1. A method of processing a circuit design, comprising: performing operations by one or more processors that are coupled to a memory having a stored circuit design, the operations including:
    determining pin slack values for pins of circuit elements in the circuit design, respectively, wherein the pin slack value of a pin is a least of slack values of all paths that fanin to the pin;
    selecting a subset of endpoints of the circuit design, each endpoint of the subset being one of the circuit elements and having a pin slack value in a critical slack range;
    determining startpoints of the circuit design that are in a respective critical fanin cone of each endpoint of the subset, wherein all pin slack values in each respective critical fanin cone are in the critical slack range, and each startpoint is one of the circuit elements;
    determining for each endpoint of the subset, a respective arrival time from each startpoint in the respective critical fanin cone;
    determining for each pair including an endpoint of the subset and a startpoint in the respective critical fanin cone, a respective set of constraint values as a function of the respective arrival time from the startpoint; and
    generating a graph in the memory for endpoints of the subset and startpoints that are in the respective critical fanin cones of the endpoints of the subset, wherein first nodes in the graph represent the startpoints and second nodes in the graph represent the endpoints, and values in the respective set of constraint values are associated with edges that connect the first nodes and the second nodes;
    modifying the circuit design based on the constraint values associated with the edges in the graph; and
    generating a circuit from the modified circuit design.

2. The method of claim 1, wherein the circuit design specifies connections between circuit elements, and the determining startpoints includes:
    tracing the connections between the circuit elements beginning at one of the endpoints in the subset;
    continuing tracing a connection at a pin having a pin slack value within the critical slack range;
    terminating tracing a connection at a pin having a pin slack value outside the critical slack range; and
    terminating tracing a connection at a startpoint.

3. The method of claim 1, wherein the determining the respective arrival time includes:
    determining a startpoint arrival time of a signal at a startpoint in the respective critical fanin cone;
    tagging the startpoint arrival time with a unique startpoint identifier;
    determining delays of connections and circuit elements between the startpoint in the respective critical fanin cone and the endpoint; and
    accumulating the startpoint arrival time and the delays as the respective arrival time of the endpoint.

4. The method of claim 3, wherein the accumulating the startpoint arrival time and the delays includes accumulating the startpoint arrival time and the delays without merging delays within logic elements using the unique startpoint identifier to distinguish between arrival times from different startpoints.

5. The method of claim 1, wherein the stored circuit design includes a netlist specification of circuit elements from each endpoint of the subset to the startpoints in the respective critical fanin cone, and the determining the respective arrival time for each endpoint of the subset includes:
    concurrently determining respective startpoint arrival times of signals at the startpoints in the respective critical fanin cone; and
    concurrently determining, at each level of the netlist specification from the startpoints in the respective critical fanin cone to the endpoint, arrival times at circuit elements in the level.

6. The method of claim 5, wherein the concurrently determining arrival times at circuit elements in the level, includes:
    allocating for each output pin of the circuit elements, a portion of memory for a respective data structure that stores accumulated arrival times for the output pin;
    for each startpoint in a fanin cone of an output pin of a circuit element in the level, storing a respective accumulated arrival time in the respective data structure for the output pin; and
    releasing the portion of memory allocated to the respective data structure of an output pin of a circuit element in the respective critical fanin cone in response to completion of accumulating arrival times in a level of the netlist specification that is a highest level in the netlist specification of fanout of the output pin.

7. The method of claim 1, further comprising:
determining for each pair including an endpoint of the subset and a startpoint in the respective critical fanin cone, a respective endpoint slack value as a function of the respective arrival time and a respective expected arrival time; and wherein:
each respective set of constraint values includes a setup path delay value and a hold path delay value, and
the setup path delay value and the hold path delay value are associated with edges connecting the first nodes and second nodes.

8. The method of claim 7, wherein:
the determining the setup path delay value includes determining the respective setup path delay value as a function of a clock period and the endpoint slack value; and
the determining the respective hold path delay value includes determining the respective hold path delay value as a function of a hold time requirement and the endpoint slack value.

9. The method of claim 7, wherein:
the determining the respective setup path delay value includes determining the respective setup path delay value as a function of a setup-class constraint time requirement and the endpoint slack value; and
the determining the respective hold path delay value includes determining the respective hold path delay value as a function of a hold-class constraint time requirement and the endpoint slack value.

10. The method of claim 1, wherein the determining pin slack values, selecting the subset of endpoints, determining startpoints, determining the respective arrival time, determining the respective set of constraint values, and generating the graph are performed in executing a timer function of a static timing analysis tool.

11. A system, comprising:
one or more processors;
a memory coupled to the one or more processors, wherein the memory is configured with a circuit design and with instructions that when executed by the one or more processors cause the one or more processors to perform operations including:
determining pin slack values for pins of circuit elements in the circuit design, wherein the pin slack value of a pin is a least of slack values of all paths that fanin to the pin;
selecting a subset of endpoints of the circuit design based on pin slack values of the endpoints being in a critical slack range, each endpoint being one of the circuit elements;
determining startpoints of the circuit design that are in a respective critical fanin cone of each endpoint of the subset, wherein all pin slack values in each respective critical fanin cone are in the critical slack range, and each startpoint is one of the circuit elements;
determining for each endpoint of the subset, a respective arrival time from each startpoint in the respective critical fanin cone;
determining for each pair including an endpoint of the subset and a startpoint in the respective critical fanin cone, a respective set of constraint values as a function of the respective arrival time from the startpoint; and
generating a graph in the memory for endpoints of the subset and startpoints that are in the respective critical fanin cones of the endpoints of the subset, wherein first nodes in the graph represent the startpoints and second nodes in the graph represent the endpoints, and values in the respective set of constraint values are associated with edges that connect the first nodes and the second nodes;
modifying the circuit design based on the constraint values associated with the edges in the graph; and
generating a circuit from the modified circuit design.

12. The system of claim 11, wherein the circuit design specifies connections between circuit elements, and the instructions for determining startpoints include instructions that when executed by the one or more processors cause the one or more processors to perform operations including:
tracing the connections between the circuit elements beginning at one of the endpoints in the subset;
continuing tracing a connection at a pin having a pin slack value within the critical slack range;
terminating tracing a connection at a pin having a pin slack value outside the critical slack range; and
terminating tracing a connection at a startpoint.

13. The system of claim 11, wherein the instructions for determining the respective arrival time include instructions that when executed by the one or more processors cause the one or more processors to perform operations including:
determining a startpoint arrival time of a signal at a startpoint in the respective critical fanin cone;
tagging the startpoint arrival time with a unique startpoint identifier;
determining delays of connections and circuit elements between the startpoint in the respective critical fanin cone and the endpoint; and
accumulating the startpoint arrival time and the delays as the respective arrival time of the endpoint.

14. The system of claim 13, wherein the instructions for accumulating the startpoint arrival time and the delays include instructions that when executed by the one or more processors cause the one or more processors to accumulate the startpoint arrival time and the delays without merging delays within logic elements using the unique startpoint identifier to distinguish between arrival times from different startpoints.

15. The system of claim 11, wherein the circuit design includes a netlist specification of circuit elements from each endpoint of the subset to the startpoints in the respective critical fanin cone, and the instructions for determining the respective arrival time for each endpoint of the subset include instructions that when executed by the one or more processors cause the one or more processors to perform operations including:
concurrently determining respective startpoint arrival times of signals at the startpoints in the respective critical fanin cone; and
concurrently determining, at each level of the netlist specification from the startpoints in the respective critical fanin cone to the endpoint, arrival times at circuit elements in the level.

16. The system of claim 15, wherein the instructions for concurrently determining arrival times at circuit elements in the level include instructions that when executed by the one or more processors cause the one or more processors to perform operations including:
allocating for each output pin of the circuit elements, a portion of memory for a respective data structure that stores accumulated arrival times for the output pin;

for each startpoint in a fanin cone of an output pin of a circuit element in the level, storing a respective accumulated arrival time in the respective data structure for the output pin; and releasing the portion of memory allocated to the respective data structure of an output pin of a circuit element in the respective critical fanin cone in response to completion of accumulating arrival times in a level of the netlist specification that is a highest level in the netlist specification of fanout of the output pin.

17. The system of claim 11, wherein the memory is configured with further instructions that when executed by the one or more processors cause the one or more processors to perform operations including:

determining for each pair including an endpoint of the subset and a startpoint in the respective critical fanin cone, a respective endpoint slack value as a function of the respective arrival time and a respective expected arrival time; and wherein:
each respective set of constraint values includes a setup path delay value and a hold path delay value, and
the setup path delay value and the hold path delay value are associated with edges connecting the first nodes and second nodes.

18. The system of claim 17, wherein:
the instructions for determining the setup path delay value include instructions that when executed by the one or more processors cause the one or more processors to determine the respective setup path delay value as a function of a clock period and the endpoint slack value; and the instructions for determining the respective hold path delay value include instructions that when executed by the one or more processors cause the one or more processors to determine the respective hold path delay value as a function of a hold time requirement and the endpoint slack value.

19. The system of claim 17, wherein:
the instructions for determining the respective setup path delay value include instructions that when executed by the one or more processors cause the one or more processors to determine the respective setup path delay value as a function of a setup-class constraint time requirement and the endpoint slack value; and the instructions for determining the respective hold path delay value include instructions that when executed by the one or more processors cause the one or more processors to determine the respective hold path delay value as a function of a hold-class constraint time requirement and the endpoint slack value.

20. The system of claim 11, wherein the instructions for determining pin slack values, selecting the subset of endpoints, determining startpoints, determining the respective arrival time, determining the respective set of constraint values, and generating the graph are in a timer function of a static timing analysis tool.

* * * * *